(12) United States Patent
Watanabe et al.

(10) Patent No.: US 10,041,541 B2
(45) Date of Patent: Aug. 7, 2018

(54) ROLLING BEARING DEVICE

(71) Applicant: JTEKT CORPORATION, Osaka-shi, Osaka (JP)

(72) Inventors: Hajime Watanabe, Kashiwara (JP); Yusuke Aoki, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 15/607,844

(22) Filed: May 30, 2017

(65) Prior Publication Data

US 2017/0350450 A1 Dec. 7, 2017

(30) Foreign Application Priority Data

Jun. 7, 2016 (JP) .................. 2016-113190

(51) Int. Cl.
*F16C 33/66* (2006.01)
*F16N 7/36* (2006.01)
*F16C 29/04* (2006.01)

(52) U.S. Cl.
CPC ...... *F16C 33/6677* (2013.01); *F16C 33/6681* (2013.01); *F16N 7/36* (2013.01); *F05B 2240/50* (2013.01); *F16C 29/04* (2013.01); *F16C 33/66* (2013.01)

(58) Field of Classification Search
CPC . F16C 33/6677; F16C 33/6681; F16C 41/002
See application file for complete search history.

(56) References Cited

U.S. PATENT DOCUMENTS 6,102,574 A * 8/2000 Proschel .............. F16C 41/002
                                                        105/218.1
2006/0165328 A1    7/2006 Ueno et al.
2015/0355075 A1* 12/2015 Murray ............... G01M 13/045
                                                        384/448

FOREIGN PATENT DOCUMENTS

JP    2004-108388 A    4/2004
JP    2008-304037 A    12/2008

* cited by examiner

*Primary Examiner* — Thomas R Hannon
(74) *Attorney, Agent, or Firm* — Oliff PLC

(57) ABSTRACT

A rolling bearing device includes a first bearing section including a first outer ring, a first inner ring, and a plurality of balls, each of which is made of metal, and a second bearing section including a second outer ring, a second inner ring, and a plurality of balls, each of which is made of metal. The first inner ring and the second inner ring are electrically connected to each other, and the first outer ring and the second outer ring are electrically insulated from each other. The first outer ring is provided with an input contact for an electric signal, and the second outer ring is provided with an output contact for the electric signal.

3 Claims, 5 Drawing Sheets

ROLLING BEARING DEVICE

INCORPORATION BY REFERENCE

The disclosure of Japanese Patent Application No. 2016-113190 filed on Jun. 7, 2016 including the specification, drawings and abstract, is incorporated herein by reference in its entirety.

BACKGROUND OF THE INVENTION

1. Field of the Invention

The present invention relates to a rolling bearing device.

2. Description of the Related Art

In recent years, various machine tools have been required to increase the speed of spindles for improvement in processing efficiency and production efficiency. When the spindle is rotated at high speed, a problem arises particularly in the lubricity of a bearing section that supports the spindle. In view of this problem, there is proposed a rolling bearing device in which an oil supply unit is provided adjacent to the bearing section in an axial direction (see Japanese Patent Application Publication No. 2004-108388 (JP 2004-108388 A)). The oil supply unit includes a tank configured to store lubricating oil, and a pump configured to supply the lubricating oil to an annular space between an inner ring and an outer ring of the bearing section.

In the rolling bearing device including the oil supply unit, lubricating oil is supplied from the pump before the bearing section runs short of the lubricating oil, thereby maintaining the lubricity of the bearing section to prevent seizing thereof. However, the above-mentioned rolling bearing device that has been proposed thus far is not provided with a device for grasping the state of lubrication of the bearing section, and thus a problem arises in the timing to supply oil.

The oil supply unit is housed in a narrow space between the spindle and a housing together with the bearing section, and hence the capacity of the tank is limited. Therefore, it is necessary to prevent excessive supply of lubricating oil. When the oil is excessively supplied, rotational resistance (for example, stirring resistance) due to the lubricating oil increases. Therefore, it is preferred that the oil be supplied at an appropriate timing.

In view of this, there is proposed a technology of grasping the state of lubrication of the bearing section by forming an electric circuit in the bearing section so that an electric signal (current) is input from the outer ring fixed to the housing and is output from a shaft or the inner ring to be rotated together with the shaft (see, for example, Japanese Patent Application Publication No. 2008-304037 (JP 2008-304037 A)). Specifically, in a state in which an oil film is stably formed between each of the inner ring and the outer ring and rolling elements, the oil film functions as insulation to weaken electric conduction of the electric circuit. When the oil film is partially lost, each of the inner ring and the outer ring is brought into metal contact with the rolling elements, and therefore the ratio of electric conduction of the electric circuit increases. Thus, the state of the oil film can be grasped by monitoring the state of electric conduction of the electric circuit of the bearing section.

In order to grasp the state of the oil film by forming the electric circuit in the bearing section, it is necessary to provide a contact to be brought into sliding contact with the rotating shaft or inner ring. A slip ring only needs to be used for obtaining such a contact. When the shaft and the inner ring are rotated at high speed as in the case of, for example, a machine tool, however, a slip ring adapted to the high-speed rotation is extremely expensive, and it is structurally difficult to provide the slip ring in the small bearing section. As another measure, a carbon brush may be pressed against the inner ring or the shaft. In this case, however, the state of contact between the carbon brush and the inner ring or the shaft is unstable, and it is difficult to stably monitor the state of electric conduction with an electric signal having low intensity. Therefore, lack of reliability is a problem when grasping the state of the oil film. The technology of grasping the state of the oil film by forming the electric circuit in the bearing section may be required not only in the rolling bearing device including the oil supply unit but also in general rolling bearings.

SUMMARY OF THE INVENTION

It is one object of the present invention to provide a rolling bearing device in which the state of an oil film in a bearing section can be detected without using a slip ring and a carbon brush.

A rolling bearing device according to one aspect of the present invention has the following features in its structure. That is, the rolling bearing device includes a first bearing section and a second bearing section. The first bearing section includes a first fixed ring, a first rotary ring, and a plurality of first rolling elements, each of which is made of metal. The plurality of first rolling elements are interposed between the first fixed ring and the first rotary ring. The second bearing section includes a second fixed ring, a second rotary ring, and a plurality of second rolling elements, each of which is made of metal. The second fixed ring is fixed together with the first fixed ring. The second rotary ring is configured to rotate together with the first rotary ring. The plurality of second rolling elements are interposed between the second fixed ring and the second rotary ring. The first rotary ring and the second rotary ring are electrically connected to each other, and the first fixed ring and the second fixed ring are electrically insulated from each other. The first fixed ring is provided with an input contact for an electric signal, and the second fixed ring is provided with an output contact for the electric signal.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
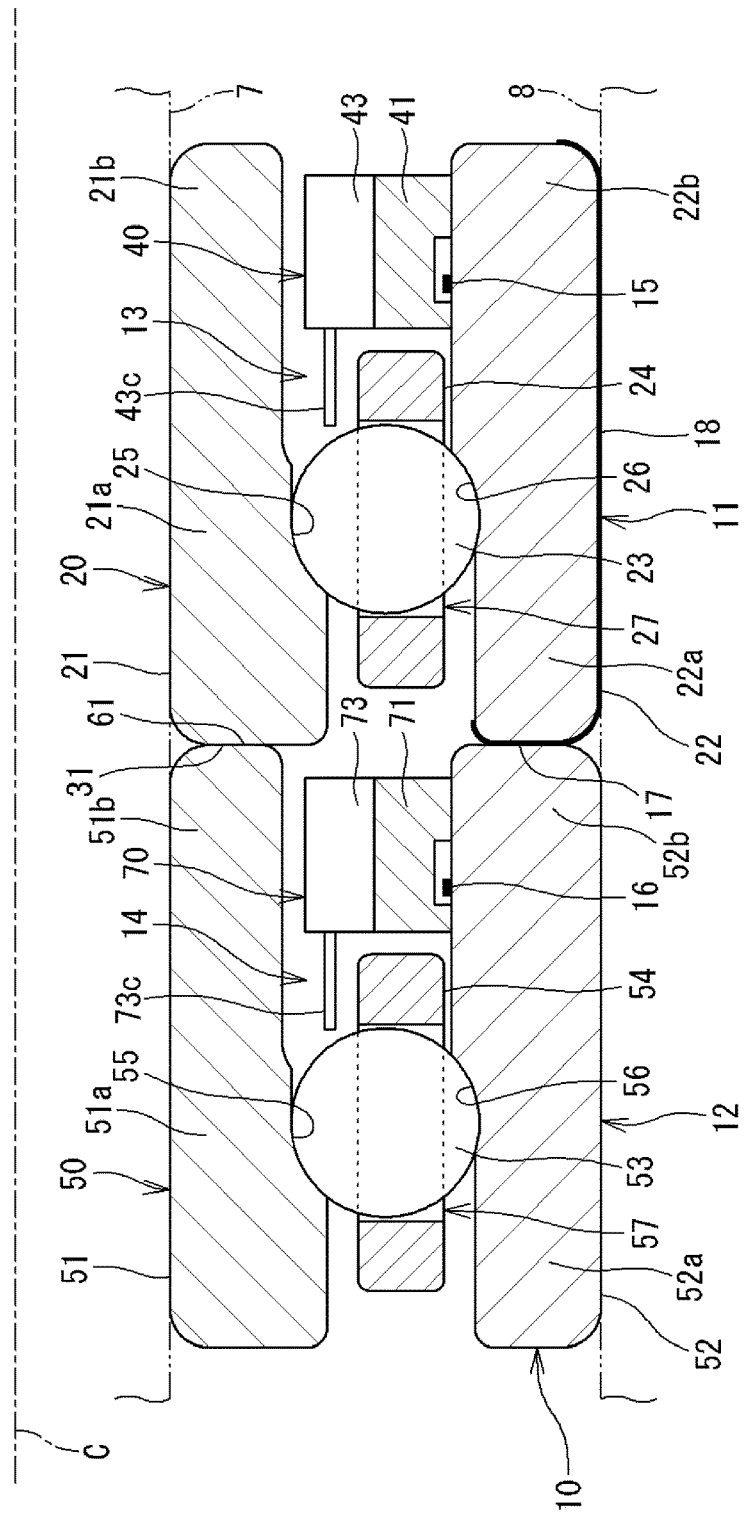
FIG. 1 is a sectional view illustrating a rolling bearing device according to one embodiment of the present invention.

FIG. 1 is a sectional view illustrating a rolling bearing device according to one embodiment of the present invention. A rolling bearing device 10 (hereinafter referred to also as a bearing device 10) is configured to support a spindle (shaft 7) of a spindle device provided to a machine tool so that the spindle is rotatable, and is accommodated in a housing 8 of the spindle device. FIG. 1 illustrates the shaft 7 and the housing 8 with long dashed double-short dashed lines. The bearing device 10 includes a first bearing 11 provided on one side in an axial direction (right side in FIG. 1), and a second bearing 12 provided on the other side in the axial direction (left side in FIG. 1). In the following description, a direction parallel to a central line C of the bearing device 10 is referred to as an axial direction, and a direction orthogonal to the axial direction is referred to as a radial direction.

The first bearing 11 includes a first bearing section 20 and a first oil supply unit 40. The first bearing section 20 includes an inner ring 21, an outer ring 22, a plurality of balls (rolling elements) 23, and a cage 24 configured to retain the plurality of balls 23, thereby constituting a ball bearing (rolling bearing).

The inner ring 21 of this embodiment is long in the axial direction, and includes an inner ring body portion 21a and an inner ring cylinder portion 21b. The inner ring body portion 21a has a raceway surface (hereinafter referred to as an inner ring raceway 25) with which the balls 23 are brought into rolling contact. The inner ring cylinder portion 21b extends from the inner ring body portion 21a to one side in the axial direction. The inner ring body portion 21a and the inner ring cylinder portion 21b are integrated with each other, but may be separated from each other. In this case, the inner ring body portion 21a functions as an inner ring of the bearing section 20, and the inner ring cylinder portion 21b functions as a spacer for the inner ring. When the inner ring body portion 21a and the inner ring cylinder portion 21b are separated from each other, the inner ring body portion 21a and the inner ring cylinder portion 21b are adjacently held in metal contact with each other, thereby assuming an electrically connected state.

The outer ring 22 of this embodiment is long in the axial direction, and includes an outer ring body portion 22a and an outer ring cylinder portion 22b. The outer ring body portion 22a has a raceway surface (hereinafter referred to as an outer ring raceway 26) with which the balls 23 are brought into rolling contact. The outer ring cylinder portion 22b extends from the outer ring body portion 22a to one side in the axial direction, and has the oil supply unit 40 mounted thereon. The outer ring body portion 22a and the outer ring cylinder portion 22b are integrated with each other, but may be separated from each other. In this case, the outer ring body portion 22a functions as an outer ring of the bearing section 20, and the outer ring cylinder portion 22b functions as a spacer for the outer ring and also as a member having the oil supply unit 40 mounted thereon. When the outer ring body portion 22a and the outer ring cylinder portion 22b are separated from each other, the outer ring body portion 22a and the outer ring cylinder portion 22b are adjacently held in metal contact with each other, thereby assuming an electrically connected state.

A first annular space 13 is formed between the inner ring body portion 21a and the outer ring body portion 22a. The plurality of balls 23 and the cage 24 are provided in the annular space 13. The balls 23 are interposed between the inner ring 21 and the outer ring 22, and are brought into rolling contact with the inner ring raceway 25 and the outer ring raceway 26 through rotation of the bearing. The cage 24 has an annular shape with a plurality of pockets 27 formed along a circumferential direction. One ball 23 is received in each pocket 27. The inner ring 21, the outer ring 22, and the ball 23 are each made of conductive steel (metal) such as bearing steel, whereas the cage 24 is made of resin.

The first oil supply unit 40 has a circular ring shape in its entirety, and is mounted on an inner circumferential side of the outer ring cylinder portion 22b and provided adjacent to the first annular space 13 in the axial direction. The oil supply unit 40 has a function of supplying oil to the first bearing section 20 (raceways 25 and 26, balls 23, and cage 24). Details of the structure and function of the oil supply unit 40 are described later.

As described above, in this embodiment, the outer ring 22 provided with the oil supply unit 40 is mounted on the housing 8 in a fixed state (stationary state), and the inner ring 21 is rotated together with the shaft 7. That is, the outer ring 22 serves as a first fixed ring in a fixed state, and the inner ring 21 serves as a first rotary ring to be rotated together with the shaft 7.

The second bearing 12 includes a second bearing section 50 and a second oil supply unit 70. The second bearing section 50 includes an inner ring 51, an outer ring 52, a plurality of balls (rolling elements) 53, and a cage 54 configured to retain the plurality of balls 53, thereby constituting a ball bearing (rolling bearing).

The inner ring 51 of this embodiment is long in the axial direction, and includes an inner ring body portion 51a and an inner ring cylinder portion 51b. The inner ring body portion 51a has a raceway surface (hereinafter referred to as an inner ring raceway 55) with which the balls 53 are brought into rolling contact. The inner ring cylinder portion 51b extends from the inner ring body portion 51a to one side in the axial direction. The inner ring body portion 51a and the inner ring cylinder portion 51b are integrated with each other, but may be separated from each other. In this case, the inner ring body portion 51a functions as an inner ring of the bearing section 50, and the inner ring cylinder portion 51b functions as a spacer for the inner ring.

The outer ring 52 of this embodiment is long in the axial direction, and includes an outer ring body portion 52a and an outer ring cylinder portion 52b. The outer ring body portion 52a has a raceway surface (hereinafter referred to as an outer ring raceway 56) with which the balls 53 are brought into rolling contact. The outer ring cylinder portion 52b extends from the outer ring body portion 52a to one side in the axial direction, and has the oil supply unit 70 mounted thereon. The outer ring body portion 52a and the outer ring cylinder portion 52b are integrated with each other, but may be separated from each other. In this case, the outer ring body portion 52a functions as an outer ring of the bearing section 50, and the outer ring cylinder portion 52b functions as a spacer for the outer ring and also as a member having the oil supply unit 70 mounted thereon.

A second annular space 14 is formed between the inner ring body portion 51a and the outer ring body portion 52a. The plurality of balls 53 and the cage 54 are provided in the annular space 14. The balls 53 are interposed between the inner ring 51 and the outer ring 52, and are brought into rolling contact with the inner ring raceway 55 and the outer ring raceway 56 through rotation of the bearing. The cage 54 has an annular shape with a plurality of pockets 57 formed along the circumferential direction. One ball 53 is received in each pocket 57. The inner ring 51, the outer ring 52, and the ball 53 are each made of conductive steel (metal) such as bearing steel, whereas the cage 54 is made of resin.

The second oil supply unit 70 has a circular ring shape in its entirety, and is mounted on an inner circumferential side of the outer ring cylinder portion 52b and provided adjacent to the second annular space 14 in the axial direction. The oil supply unit 70 has a function of supplying oil to the second bearing section 50 (raceways 55 and 56, balls 53, and cage 54). Details of the structure and function of the oil supply unit 70 are described later.

As described above, in this embodiment, the outer ring 52 provided with the oil supply unit 70 is mounted on the housing 8 in a fixed state (stationary state), and the inner ring 51 is rotated together with the shaft 7. That is, the outer ring 52 serves as a second fixed ring that is in a fixed state together with the first outer ring 22 (first fixed ring), and the inner ring 51 serves as a second rotary ring to be rotated together with the shaft 7 and the first inner ring 21 (first rotary ring).

Figure 2:
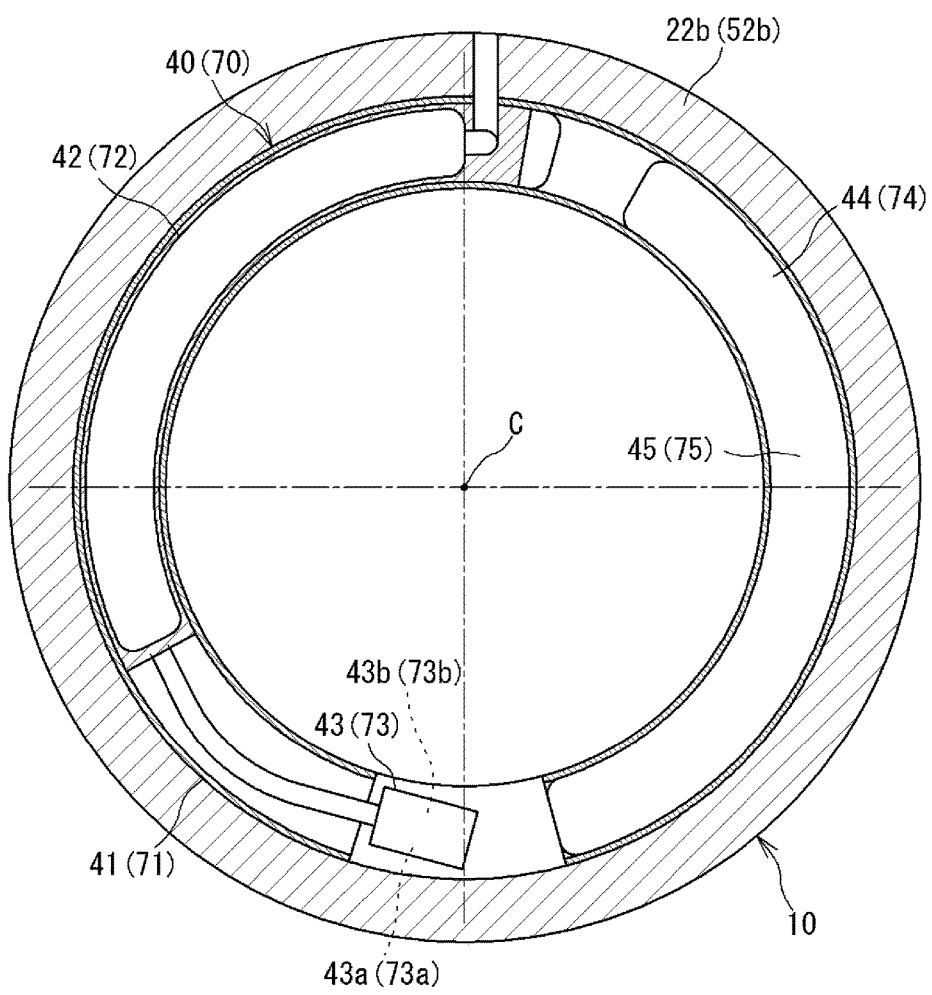
FIG. 2 is a sectional view illustrating a first oil supply unit that is viewed in an axial direction.

FIG. 2 is a sectional view illustrating the first oil supply unit 40 that is viewed in the axial direction. The first oil supply unit 40 has a circular ring shape in its entirety. The oil supply unit 40 includes a tank 42 configured to store lubricating oil (oil), and a pump 43 configured to eject the lubricating oil. The tank 42 and the pump 43 are provided in an annular body portion 41 of the oil supply unit 40. The oil supply unit 40 includes a control portion 44 and a power supply portion 45.

The body portion 41 is mounted on the inner circumferential side of the outer ring cylinder portion 22b, and has a function as a frame configured to retain the pump 43 and the like. The body portion 41 is a member having a circular ring shape with a hollow space formed therein. The pump 43, the control portion 44, and the power supply portion 45 are provided in the hollow space. A part of the hollow space serves as the tank 42. Thus, the oil supply unit 40 including the body portion 41, the tank 42, the pump 43, the control portion 44, the power supply portion 45 and the like is constructed as an integrated component. Some or all of the tank 42, the control portion 44, and the power supply portion 45 may be provided outside the bearing device 10 (housing 8), and are connected to the pump 43 and the like through a pipe and a communication line in this case.

The first oil supply unit 40 and the second oil supply unit 70 have the same structure. The second oil supply unit 70 is described with reference to FIG. 2. The second oil supply unit 70 has a circular ring shape in its entirety. The oil supply unit 70 includes a tank 72 configured to store lubricating oil (oil), and a pump 73 configured to eject the lubricating oil. The tank 72 and the pump 73 are provided in an annular body portion 71 of the oil supply unit 70. The oil supply unit 70 includes a control portion 74 and a power supply portion 75.

The body portion 71 is mounted on the inner circumferential side of the outer ring cylinder portion 52b, and has a function as a frame configured to retain the pump 73 and the like. The body portion 71 is a member having a circular ring shape with a hollow space formed therein. The pump 73, the control portion 74, and the power supply portion 75 are provided in the hollow space. A part of the hollow space serves as the tank 72. Thus, the oil supply unit 70 including the body portion 71, the tank 72, the pump 73, the control portion 74, the power supply portion 75 and the like is constructed as an integrated component. Some or all of the tank 72, the control portion 74, and the power supply portion 75 may be provided outside the bearing device 10 (housing 8), and are connected to the pump 73 and the like through a pipe and a communication line in this case.

Figure 3:
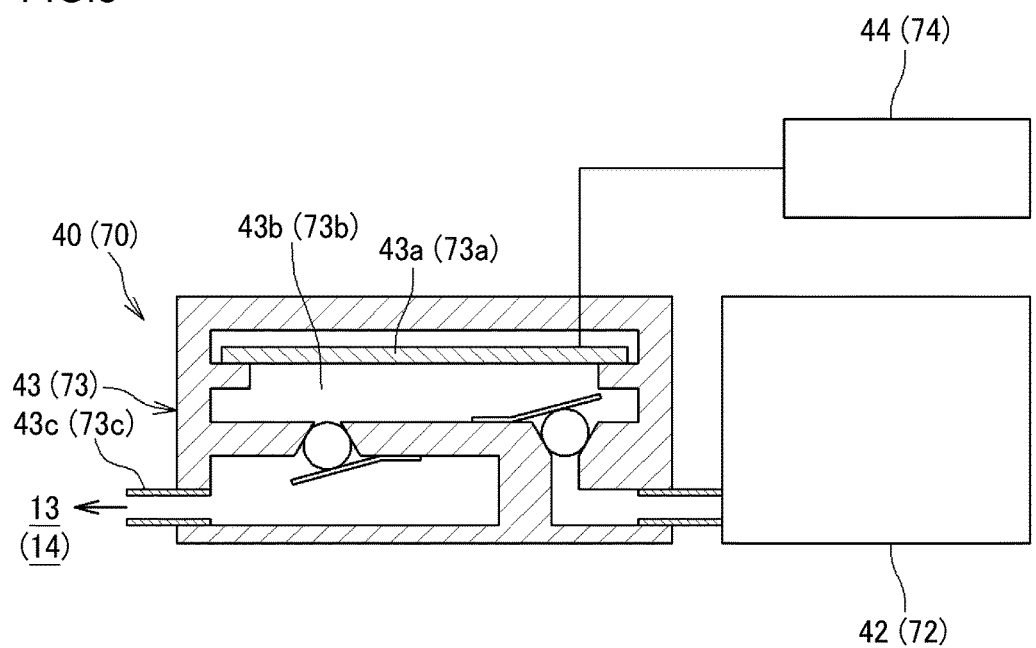
FIG. 3 is an explanatory view illustrating a function of the oil supply unit.

As described above, the first oil supply unit 40 and the second oil supply unit 70 have the same structure, and also have the same function. Therefore, the function is described with reference to FIG. 3 taking the first oil supply unit 40 as an example. The pump 43 has a piezoelectric element 43a therein. The piezoelectric element 43a operates to change the volume of an oil chamber (internal space) 43b of the pump 43, and therefore the lubricating oil in the oil chamber 43b can be supplied to the annular space 13 through a nozzle 43c. The oil chamber 43b is a space in the pump 43 where the lubricating oil is stored. Similarly, the pump 73 of the second oil supply unit 70 has a piezoelectric element 73a, an oil chamber 73b, and a nozzle 73c. The power supply portion 45 (see FIG. 2) supplies electric power for operating the pump 43. In FIG. 3, the control portion 44 applies a drive voltage having a predetermined waveform to the piezoelectric element 43a at a predetermined timing. As a result, the lubricating oil is supplied from the pump 43 to the annular space 13. A small amount of lubricating oil is ejected from the oil chamber 43b through one operation of the piezoelectric element 43a, and therefore the piezoelectric element 43a is caused to operate a plurality of times for one oil supply operation. Every time the lubricating oil is ejected from the oil chamber 43b, the oil chamber 43b is automatically replenished with lubricating oil from the tank 42.

In the embodiment illustrated in FIG. 1, the first bearing 11 on the right side and the second bearing 12 on the left side are provided adjacent to each other in the axial direction. The first inner ring 21 of the first bearing 11 and the second inner ring 51 of the second bearing 12 are held in contact with each other in the axial direction. That is, a face 31 of the first inner ring 21 on the other side in the axial direction and a face 61 of the second inner ring 51 on one side in the axial direction are held in surface contact (metal surface contact) with each other. Therefore, the first inner ring 21 and the second inner ring 51 are electrically connected to each other. In particular, the first inner ring 21 and the second inner ring 51 are applied with loads in the axial direction to press each other, and thus the opposing faces 31 and 61 are held in close contact with each other.

In contrast, the first outer ring 22 of the first bearing 11 on the right side and the second outer ring 52 of the second bearing 12 on the left side are electrically insulated from each other. In the embodiment illustrated in FIG. 1, an annular insulator 17 is provided between the first outer ring 22 and the second outer ring 52. The insulator 17 is formed of, for example, a non-conductive resin or rubber member. The housing 8 is made of metal, and therefore an insulator 18 is also provided on an outer circumferential surface side of at least one of the first outer ring 22 and the second outer ring 52 so as to electrically insulate the first outer ring 22 and the second outer ring 52 from each other. In the embodiment illustrated in FIG. 1, the insulator 18 is provided only on the first outer ring 22 side. The insulator 18 has a cylindrical shape, but may be continuous with the annular insulator 17. The insulator 18 only needs to be provided between the first outer ring 22 and the housing 8.

The insulators 17 and 18 may be members separated from the outer ring 22, but may be integrated with the outer ring 22 (or the housing 8). When the insulators 17 and 18 are integrated with the outer ring 22 (or the housing 8), for example, a non-conductive coating material applied to the outer ring 22 (or the housing 8) may be used as the insulators 17 and 18. With the structure described above, the first outer ring 22 of the first bearing 11 on the right side and the second outer ring 52 of the second bearing 12 on the left side are electrically insulated from each other.

In FIG. 1, the first bearing 11 and the second bearing 12 are adjacent to each other in the axial direction, but may be provided away from each other in the axial direction (not illustrated). Also in this case, the first inner ring 21 and the second inner ring 51 are electrically connected to each other via the shaft 7 because the shaft 7 is made of metal (for example, steel such as carbon steel). In this case, the first outer ring 22 and the second outer ring 52 are spaced away from each other in the axial direction to have a space formed therebetween, and therefore the annular insulator 17 can be omitted. In order to electrically connect the first inner ring 21 and the second inner ring 51 to each other, a metal spacer may be interposed therebetween (not illustrated).

Figure 4:
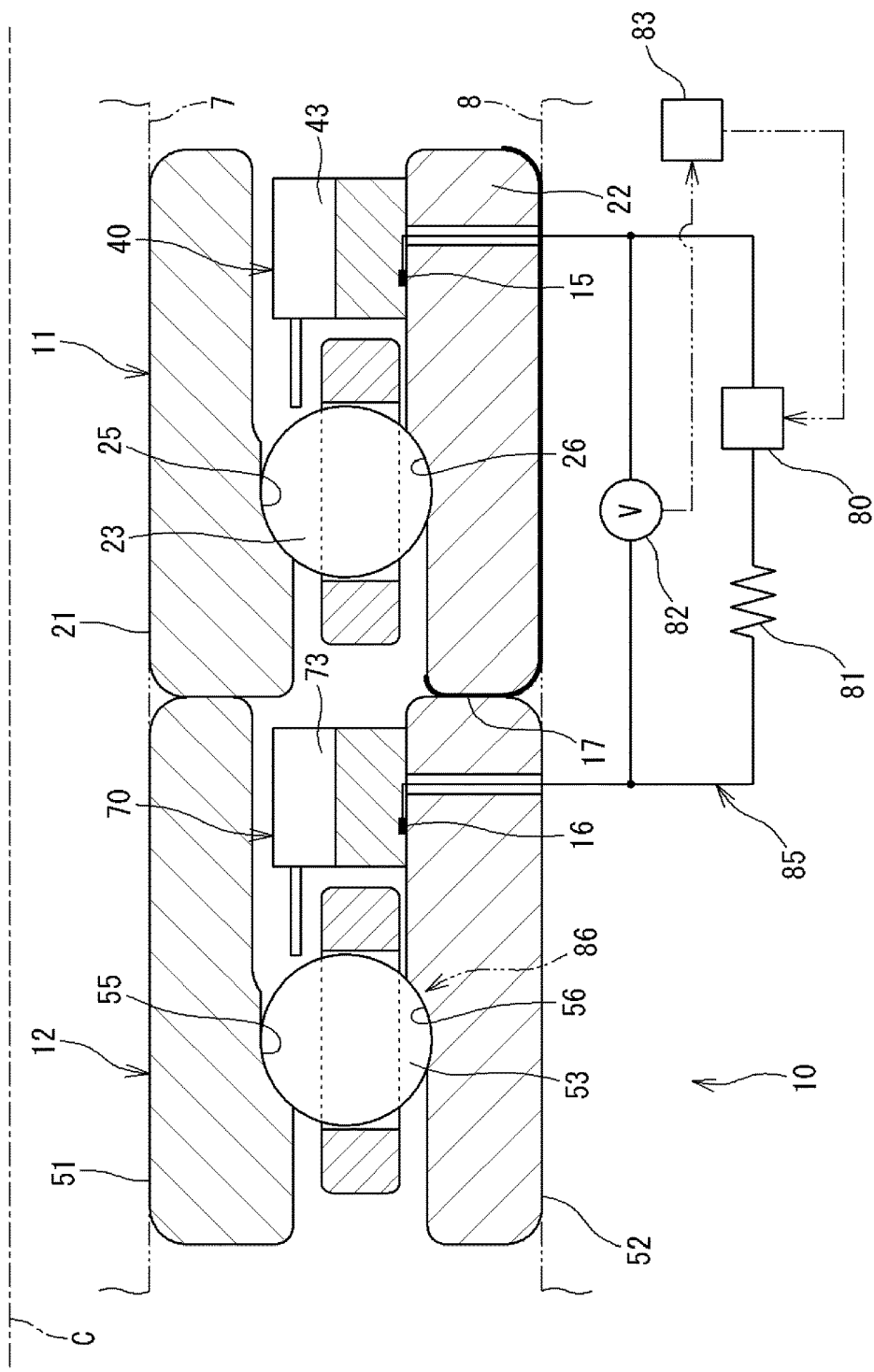
FIG. 4 is an explanatory view illustrating the schematic structure of the rolling bearing device.

The lubricity of each of the first and second bearings 11 and 12 is secured by the lubricating oil supplied from each of the first and second oil supply units 40 and 70. In the first bearing 11, an oil film is formed by the lubricating oil between the inner ring raceway 25 and the ball 23. When an oil film is also formed by the lubricating oil between the outer ring raceway 26 and the ball 23, the oil films function as insulation, and therefore an electric conduction path from the outer ring 22 to the inner ring 21 via the ball 23 is not established (that is, electricity does not flow). For example, in a state in which the oil film is not formed at an initial stage of rotation of the bearing device 10 or in which the oil film that has once been formed is partially lost due to consumption of the lubricating oil over time, however, the outer ring 22 and the inner ring 21 are brought into metal contact with the ball 23. As a result, the electric conduction path from the outer ring 22 to the inner ring 21 via the ball 23 is established (that is, electricity flows). Similarly, in the second bearing 12, when an oil film is formed between each of the inner ring raceway 55 and the outer ring raceway 56 and the ball 23, an electric conduction path from the inner ring 51 to the outer ring 52 via the ball 53 is not established (that is, electricity does not flow). In a state in which the oil film is not formed or in which the oil film that has been formed is partially lost, however, the outer ring 52 and the inner ring 51 are brought into metal contact with the ball 53, and as a result, the electric conduction path from the inner ring 51 to the outer ring 52 via the ball 53 is established (that is, electricity flows). As described above, in the first bearing 11 and the second bearing 12, an electric circuit portion (hereinafter referred to as a bearing circuit portion 86) from the outer ring 22 to the outer ring 52 via the ball 23, the inner ring 21, the inner ring 51, and the ball 53 is formed as illustrated in FIG. 4.

The first outer ring 22 on the right side is provided with an input contact (electrode) 15. The second outer ring 52 on the left side is provided with an output contact (electrode) 16. The bearing device 10 is constructed so that an electric signal (direct current) is input to the input contact 15 and is output from the output contact 16. Specifically, a direct-current power supply 80 is connected between the input contact 15 and the output contact 16. A control circuit portion 85 including the input contact 15, the output contact 16, and the direct-current power supply 80 further includes a resistor 81 and a voltmeter 82 configured to measure a voltage flowing through the circuit. The bearing device 10 further includes a controller 83. The controller 83 is capable of acquiring measurement results of the voltmeter 82 incessantly.

The controller 83 can be constructed of the control portion 44 (see FIG. 3) of the first oil supply unit 40 or the control portion 74 of the second oil supply unit 70. The controller 83 (control portion 44 or 74) is constructed of a microcomputer. The direct-current power supply 80 can be constructed of the power supply portion 45 (see FIG. 2) of the first oil supply unit 40 or the power supply portion 75 of the second oil supply unit 70. In this case, the control circuit portion 85 including the controller 83 and the direct-current power supply 80 is provided in the oil supply units 40 and 70 (body portions 41 and 71) (though the control circuit portion 85 is illustrated in FIG. 4 as if the control circuit portion 85 were provided outside the housing 8).

Figure 5:
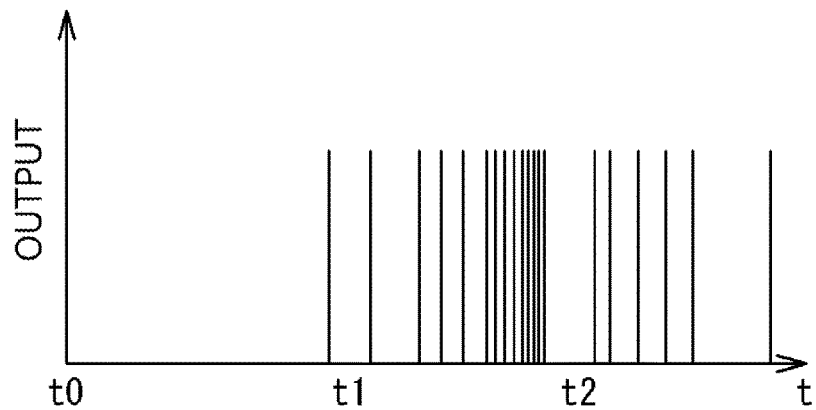
FIG. 5 is an explanatory diagram illustrating an electric signal flowing through a control circuit portion.

With the structure described above, the controller 83 can detect the state of the oil film in the bearing device 10. A method for the detection is described below. FIG. 5 is an explanatory diagram illustrating the electric signal flowing through the control circuit portion 85 (see FIG. 4). The electric signal is a signal acquired from the voltmeter 82 by the controller 83. The horizontal axis of the graph illustrated in FIG. 5 represents time, and the vertical axis represents output (voltage value) of the electric signal.

In FIG. 5, until a time t1, a stable oil film is formed in each of the first bearing 11 and the second bearing 12, and the electric conduction path is not established in the bearing circuit portion 86. The electric signal acquired by the controller 83 indicates a constant value (zero). After the time t1, the lubricating oil is consumed in each of the first bearing 11 and the second bearing 12, and the oil film that has been formed is partially lost. Then, a period of time (number of times) in which the electric conduction path is established in the bearing circuit portion 86 increases. Therefore, as illustrated in FIG. 5, the electric signal flowing through the control circuit portion 85 is randomly detected.

Figure 6:
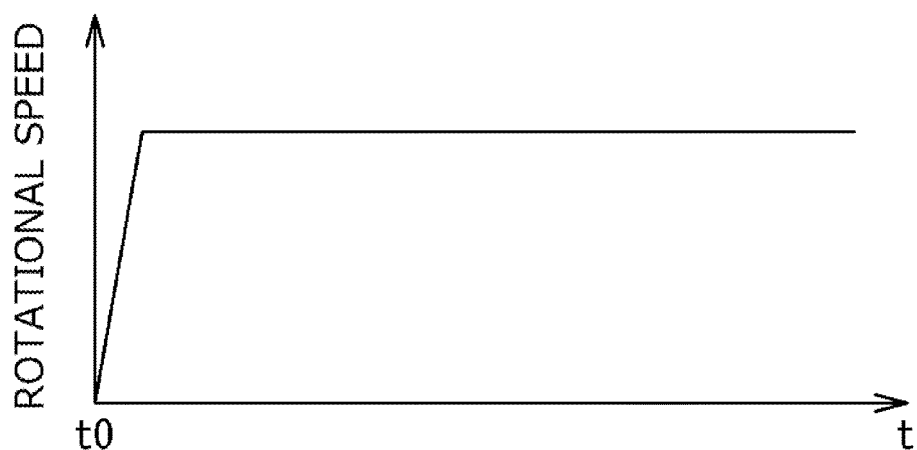
FIG. 6 is a diagram including a graph illustrating a rotational speed of a shaft along with an elapse of time, and a graph illustrating a period of time in which an electric conduction path is established in a bearing circuit portion per unit time.
Figure 6:
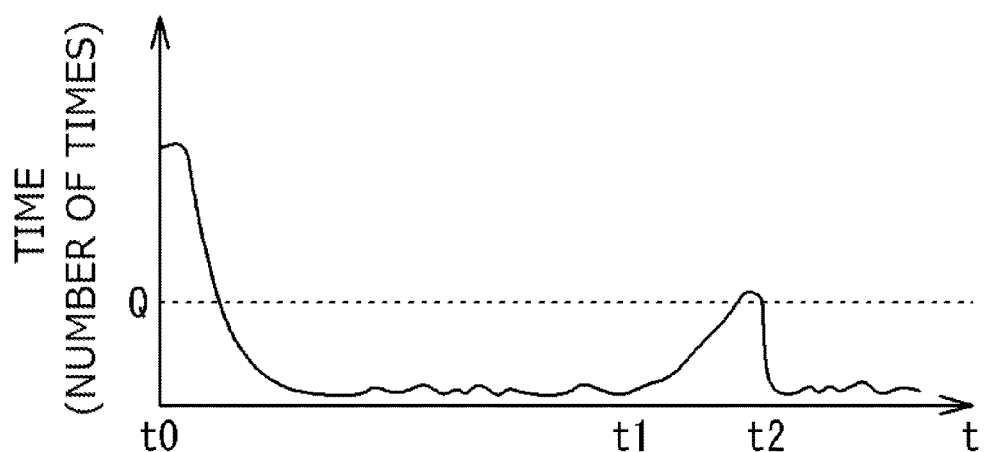

FIG. 6 is a diagram including a graph (upper graph) illustrating a rotational speed of the shaft 7 (bearing device 10) along with an elapse of time, and a graph (lower graph) illustrating a "period of time" in which the electric conduction path is established in the bearing circuit portion 86 per unit time. Note that the "number of times" the electric conduction path is established in the bearing circuit portion 86 per unit time may be employed in place of the "period of time". That is, the vertical axis of the lower graph represents the ratio of electric conduction. The period of time (number of times) in which the electric conduction path is established in the bearing circuit portion 86 is identical to a period of time (number of times) in which the electric signal flows through the control circuit portion 85.

As illustrated in the upper graph of FIG. 6, the rotational speed of the shaft 7 (bearing device 10) increases from a time t0 when the operation has started, and then the rotational speed becomes constant. Immediately after the operation has started, the oil film is not formed in each of the first and second bearings 11 and 12, and the period of time (number of times) in which the electric conduction path is established is long (large) as illustrated in the lower graph of FIG. 6.

When a certain period of time has elapsed since the start of rotation, the oil film starts to be formed, and the "period of time (number of times)" represented by the vertical axis of the lower graph of FIG. 6 decreases. When the oil film is stably formed, the electric signal acquired by the controller 83 indicates a constant value (approximately zero) as described above (see the value up to the time t1 in FIG. 5). After the time t1, the oil film that has been formed is partially lost as described above, and the "period of time (number of times)" represented by the vertical axis of the lower graph of FIG. 6 tends to increase. That is, the ratio of electric conduction tends to increase.

The controller 83 can acquire the "period of time (number of times)" based on the electric signal flowing through the control circuit portion 85. Further, the controller 83 performs processing of comparing the acquired information on the "period of time (number of times)" with a threshold Q set in advance. The comparison processing is processing of judging whether the oil film is partially lost. Specifically, when the acquired "period of time (number of times)" exceeds the threshold Q, it can be judged that the oil film is partially lost because the period of time (number of times) in which the electric conduction path is established in the bearing circuit portion 86 increases. In this case, the controller 83 controls the pumps 43 and 73 to operate. Through the oil supply performed by the pumps 43 and 73 (time t2 in the lower graph of FIG. 6), the oil film is stably formed again, and the period of time (number of times) in which the electric conduction path is established in the bearing circuit portion 86 decreases after the time t2. That is, the ratio of electric conduction decreases below the threshold Q.

As described above, when the formation of the oil film is sufficient, the oil film insulates each of the outer ring 22 (52) and the inner ring 21 (51) from the ball 23 (53), and the ratio of electric conduction is low. When the formation of the oil film is insufficient, on the other hand, each of the outer ring 22 (52) and the inner ring 21 (51) is brought into metal contact with the ball 23 (53) (metal contact occurs many times), and the ratio of electric conduction increases. In this manner, the controller 83 acquires the electric signal flowing through the control circuit portion 85 incessantly, obtains the ratio of electric conduction based on the signal flowing through the electric circuit (control circuit portion 85 and bearing circuit portion 86) including the input contact 15 and the output contact 16, and controls the pumps 43 and 73 to operate based on the ratio of electric conduction. Thus, the oil can be supplied while monitoring the state of the oil film in the bearing device 10, and therefore the lubricated state can be secured. Note that, in this embodiment, the description is given of the case where the ratio of electric conduction is used as an indicator for the detection of the state of the oil film, but another indicator may be used. For example, a value of resistance of the control circuit portion 85 may be used.

The bearing device 10 of this embodiment includes the first bearing 11 and the second bearing 12. Therefore, when it is judged that the oil film is partially lost, the controller 83 may cause both of the pump 43 of the first oil supply unit 40 and the pump 73 of the second oil supply unit 70 to operate. However, the pumps 43 and 73 may be caused to operate in the following manner from the viewpoint of efficiently using the lubricating oil.

Specifically, when it is judged that the oil film is partially lost, the controller 83 causes only one pump (43) out of the pumps 43 and 73 to operate so as to supply oil. Then, the pump (43) is stopped, and after a predetermined period of time has elapsed, the controller 83 performs the processing of judging whether the oil film is partially lost as described above. When it is judged again that the oil film is partially lost, the controller 83 causes only the other pump (73) out of the pumps 43 and 73 to operate so as to supply oil without causing the one pump (43) to operate. On the other hand, in a case where the controller 83 performs the processing of judging whether the oil film is partially lost after the above-described predetermined period of time has elapsed and it is judged that the oil film is not partially lost (the oil film is sufficiently formed), neither the pump 43 nor 73 is caused to operate (oil is not supplied).

As described above, according to the bearing device 10 of this embodiment, the electric circuit (86) in which electric conduction can be established from the first outer ring 22 provided with the input contact 15 to the second outer ring 52 provided with the output contact 16 via the ball 23, the first inner ring 21, the second inner ring 51, and the ball 53 is obtained. The input contact 15 and the output contact 16 are provided on the first and second outer rings 22 and 52 on the fixed side, that is, the contacts need not be provided on the rotating inner rings 21 and 51 or shaft 7. Therefore, a slip ring and a carbon brush are omitted. Owing to the omission of the slip ring and the carbon brush, the bearing device 10 can be constructed at low cost.

As described above, when the oil films formed by the lubricating oil are partially lost in the rolling contact regions of the balls 23 and 53 of the first bearing section 20 and the second bearing section 50, electric conduction can be established in the bearing circuit portion 86. In a state in which the oil films are stably formed, on the other hand, the oil films function as insulation to weaken the electric conduction between the input contact 15 and the output contact 16. Thus, the states of the oil films in the first bearing section 20 and the second bearing section 50 can be detected by monitoring the state of the electric conduction between the input contact 15 and the output contact 16 by the controller 83.

The bearing device 10 of this embodiment further includes the first oil supply unit 40 and the second oil supply unit 70. The first pump 43 of the first oil supply unit 40 is provided adjacent to the first annular space 13 in the axial direction, and is capable of supplying lubricating oil to the first bearing section 20. The second pump 73 of the second oil supply unit 70 is provided adjacent to the second annular space 14 in the axial direction, and is capable of supplying lubricating oil to the second bearing section 50. Therefore, when the controller 83 judges that the oil film is partially lost, that is, at a timing when oil needs to be supplied, oil can promptly be supplied to the first bearing section 20 by the first pump 43 and to the second bearing section 50 by the second pump 73.

As described above, when it is detected that the oil film is partially lost, oil is supplied to one or both of the first bearing section 20 and the second bearing section 50, and therefore trouble such as seizing can be prevented.

Note that, in the embodiment described above, the description is given of the case where the controller 83 performs the processing of judging whether the oil film is partially lost and controls the ejecting operations to be performed by the pumps 43 and 73. Alternatively, the processing and the control may be performed by different devices. For example, a controller provided outside the bearing device 10 may perform the processing of judging whether the oil film is partially lost. The control portions 44 and 74 provided inside the bearing device 10 may control the ejecting operations to be performed by the pumps 43 and 73. In this case, the controller and each of the control portions 44 and 74 communicate with each other, and when the controller has performed the processing of judging whether the oil film is partially lost, the control portions 44 and 74 control the ejecting operations to be performed by the pumps 43 and 73.

The embodiment disclosed as described above is illustrative but is not limitative in all respects. That is, the rolling bearing device of the present invention is not limited to the embodiment illustrated in the drawings, but may be implemented by other embodiments within the scope of the present invention. For example, the description is given of the case where the bearing device 10 includes the oil supply units 40 and 70, but the oil supply units 40 and 70 may be omitted. In this case, another oil supply device may be provided, or the rotation of the shaft 7 may be stopped when it is judged that the oil film is partially lost. Thus, seizing of the first bearing 11 and the second bearing 12 can be prevented.

In the embodiment described above, the description is given of the case where the outer rings 22 and 52 are fixed rings and the inner rings 21 and 51 are rotary rings, but the relationship may be reversed. That is, the inner rings 21 and 51 may be fixed rings and the outer rings 22 and 52 may be rotary rings. In this case, the input contact and the output contact are provided on the inner rings 21 and 51 that are bearing rings on the fixed side.

Further, in the embodiment described above, the description is given of the case where the bearing sections 20 and 50 are angular contact ball bearings. However, the type of the bearing is not limited thereto, and the bearing sections 20 and 50 may be deep groove ball bearings. Further, the bearing sections 20 and 50 may be tapered roller bearings or cylindrical roller bearings. In addition, the rolling bearing device 10 may be used for other purposes than for a spindle of a machine tool.

According to the present invention, the state of the oil film in the bearing section can be detected without using the slip ring and the carbon brush. For example, when it is detected that the oil film is partially lost, oil is supplied and therefore trouble such as seizing can be prevented.

What is claimed is:

1. A rolling bearing device, comprising:
    a first bearing section including a first fixed ring, a first rotary ring, and a plurality of first rolling elements, each of which is made of metal, the plurality of first rolling elements being interposed between the first fixed ring and the first rotary ring; and
    a second bearing section including a second fixed ring, a second rotary ring, and a plurality of second rolling elements, each of which is made of metal, the second fixed ring being fixed together with the first fixed ring, the second rotary ring being configured to rotate together with the first rotary ring, the plurality of second rolling elements being interposed between the second fixed ring and the second rotary ring,
    wherein the first rotary ring and the second rotary ring are electrically connected to each other, and the first fixed ring and the second fixed ring are electrically insulated from each other, and
    wherein the first fixed ring is provided with an input contact for an electric signal, and the second fixed ring is provided with an output contact for the electric signal.

2. The rolling bearing device according to claim 1, further comprising:
    a first oil supply unit provided adjacent to a first annular space in an axial direction, the first annular space being formed between the first fixed ring and the first rotary ring, the first oil supply unit including a first pump configured to supply lubricating oil to the first bearing section; and
    a second oil supply unit provided adjacent to a second annular space in the axial direction, the second annular space being formed between the second fixed ring and the second rotary ring, the second oil supply unit including a second pump configured to supply lubricating oil to the second bearing section.

3. The rolling bearing device according to claim 2, further comprising a controller configured to control operations of the first pump and the second pump based on the electric signal flowing through an electric circuit including the input contact and the output contact.

* * * * *